United States Patent
Kamada (10) Patent No.: US 10,095,454 B1
(45) Date of Patent: Oct. 9, 2018

(54) APPARATUS TRANSMITTING ACTIVATION INSTRUCTION FOR PRINTER

(71) Applicants: KABUSHIKI KAISHA TOSHIBA, Tokyo (JP); TOSHIBA TEC KABUSHIKI KAISHA, Tokyo (JP)

(72) Inventor: Jin Kamada, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/718,970

(22) Filed: Sep. 28, 2017

(51) Int. Cl.
*G06K 15/00* (2006.01)
*G06F 3/12* (2006.01)

(52) U.S. Cl.
CPC .......... *G06F 3/1261* (2013.01); *G06F 3/1212* (2013.01); *G06F 3/1221* (2013.01); *G06F 3/1288* (2013.01)

(58) Field of Classification Search
None
See application file for complete search history.

(56) References Cited

U.S. PATENT DOCUMENTS

| 5,625,757 A * | 4/1997 | Kageyama | G06F 3/1207 358/1.14 |
| 2010/0182626 A1* | 7/2010 | Wu | B41J 29/393 358/1.13 |
| 2014/0185083 A1* | 7/2014 | Cudak | G06F 3/1211 358/1.15 |

FOREIGN PATENT DOCUMENTS

JP 2011-192020 9/2011

\* cited by examiner

*Primary Examiner* — Dov Popovici
(74) *Attorney, Agent, or Firm* — Patterson & Sheridan, LLP (57) ABSTRACT

A method of performing a print operation includes receiving a print request to perform a print operation on a first printer and identifying an error with respect to the first printer. In response to the error, a second printer is selected, which is currently powered OFF, to perform the print request, based on one or more criteria. The printer request is transmitted to the second printer. The second printer includes a network interface that receives the print request and, responsive thereto, causes the second printer to be powered ON to perform the print operation.

14 Claims, 9 Drawing Sheets

APPARATUS TRANSMITTING ACTIVATION INSTRUCTION FOR PRINTER

FIELD

Embodiments described herein relate generally to a technique of reducing execution time of a print job.

BACKGROUND

In the related art, in an environment in which a plurality of printers is present, it is easy for a printer, which has high frequency of use, to run out of toner or paper. When a user tries to use a printer which has high frequency of use, the printer may not be usable in some cases because the consumables of the printer have run out and there are no replenishment goods in the vicinity of the printer. Additionally or alternatively, a printer may not be usable because a paper jam has occurred in the printer. In these cases, the user uses a printer which has low frequency of use.

However, printers having a low frequency of use are often turned off for electric power saving. Therefore, the user has to power on the printer and allow the printer to reach a state in which printing can occur, thus increasing the time for printing job execution.

In addition, even while the power of the printer which has low frequency of use is turned on, in many cases, the printer is not often used and thus may have transitioned to a sleep mode. Accordingly, the user cannot use the printer which has low frequency of use unless the user causes the printer to transition from the sleep mode to a ready mode (mode for immediately executing a job), thus also increasing printer execution time.

DETAILED DESCRIPTION

In one example, a method of performing a print operation includes receiving a print request to perform a print operation on a first printer and identifying an error with respect to the first printer. In response to the error, a second printer is selected, which is currently powered OFF, to perform the print request, based on one or more criteria. The printer request is transmitted to the second printer. The second printer includes a network interface that receives the print request and, responsive thereto, causes the second printer to be powered ON to perform the print operation.

In one example, an apparatus of an embodiment transmits an activation instruction for a second printer which is different to a first printer when it is detected that the first printer has an error or is in a state in which an error is expected to occur.

In one example, a printer of an embodiment is activated when it is determined that the printer is to be activated based on information of a first printer, which has an error or is expected to have an error, when an activation instruction is received.

In one example, an activation device of an embodiment includes a physical switch and a controller. The physical switch comes into physical contact with a power supply switch of a printer, to displace the power supply switch, and thereby turns on the power of the printer. The controller receives an activation instruction and drives the physical switch.

In one example, a non-transitory storage medium of an embodiment stores a program for causing a printer to execute transmission of an activation instruction for a second printer which is different to a first printer when it is detected that the first printer has an error or is in a state in which an error is expected to occur.

Hereinafter, embodiments are described by referring to the drawings.

First Embodiment

Hereinafter, an embodiment is described by referring to the drawings.

Figure 1:
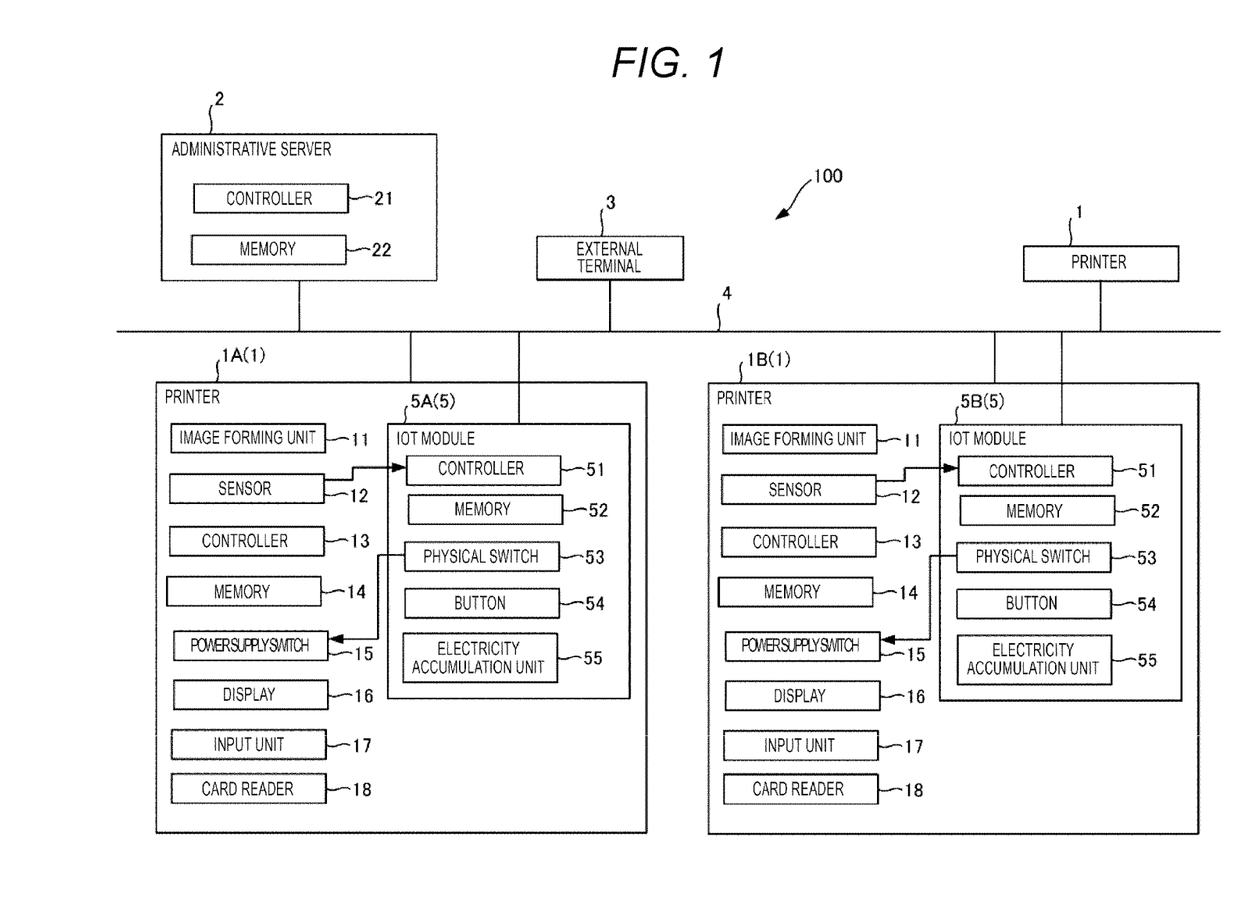
FIG. 1 is a diagram illustrating a configuration of a printing system.

FIG. 1 is a diagram illustrating a configuration of a printing system 100.

The printing system 100 includes a plurality of printers 1, an administrative server 2, and an external terminal 3. The plurality of printers 1 includes printers such as printer 1 (A and printer 1B. Unless specifically noted otherwise, reference to a printer 1 generally refers to all printers, including printers 1A and 1B. The plurality of printers 1, the administrative server 2, and the external terminal 3 are connected to each other through a network 4. The printing system 100 is a location-free printing system. The external terminal 3 is a personal computer (PC) or the like, and generates a print job. A user registers a print job in the administrative server 2 by using the external terminal 3. The user can print the print job which is registered by the user, or delete the print job from the administrative server 2, by using any printer 1 in the network 4.

In one example, the printer 1 is a multi-function peripheral (MFP) having a plurality of functions such as copying, printing, scanning, or transmitting faxes ore-mails.

Each printer 1 includes an image forming unit 11, a sensor 12, a controller 13, a memory 14, a power supply switch 15, a display 16, an input unit 17, a card reader 18, and an IOT module 5. With reference to specific printers 1A) and 1B, the printer 1A includes a corresponding IOT module 5A, and the printer 1B includes a corresponding IOT module 5B. Reference generally to a printer IOT module 5 is intended to encompass both IOT modules 5A and 5B unless specifically stated otherwise.

The image forming unit 11 forms an image on a sheet of paper. The image forming unit 11 forms a latent image on a photoreceptor by using a laser, forms a toner image by developing the latent image using the toner, and transfers the toner image from the photoreceptor to a sheet. The image forming unit 11 may form an image on a sheet by ejecting ink from a head. The printer 1 includes a scanner (not illustrated) which reads an image on a sheet. The printer 1 transmits read image data by using a fax or an e-mail, or performs printing based on the image data.

Each printer 1 in FIG. 1 includes one or more sensors 12 to detect a state, such as a normal state, of each printer 1. In one example, the sensor 12 detects a residual amount of toner, and/or detects that the waste toner is full. The sensor 12 may also detect the presence or absence of a sheet (paper jam) on a transportation path. The sensor 12 may also detect the presence or absence of sheets in a cassette in which sheets to be sent to the image forming unit 11 are stacked. The sensor 12 outputs a detection signal to the controller 13 and the IOT module 5.

The display 16 displays an image. The input unit 17 is a touch panel or the like, and receives an input from a user. The card reader 18 acquires identification information of a user from an Integrated Circuit Card (IC card).

The IOT module 5 is disposed in the vicinity of the power supply switch 15. The IOT module 5 includes a controller 51, a memory 52, a physical switch 53, a button 54, and an electricity accumulation unit 55.

The controller 51 receives a detection signal from the sensor 12 in each printer 1. The sensor 12 and the controller 51 may be connected in a wired manner, or in a wireless manner. For example, a wireless device is coupled with the existing sensor 12, which detects the residual amount of toner, and an output signal of the sensor 12 may be output to the controller 51 in a wireless manner by the wireless device. Additionally, the output signal may also be output to the controller 13, by either a wired or wireless connection.

The electricity accumulation unit 55 is a battery or the like, and supplies electric power to each unit of the IOT module 5. Since the IOT module 5 includes the electricity accumulation unit 55, even when the power of the printer 1 is turned off, the IOT module 5 can be operated.

Figure 2:
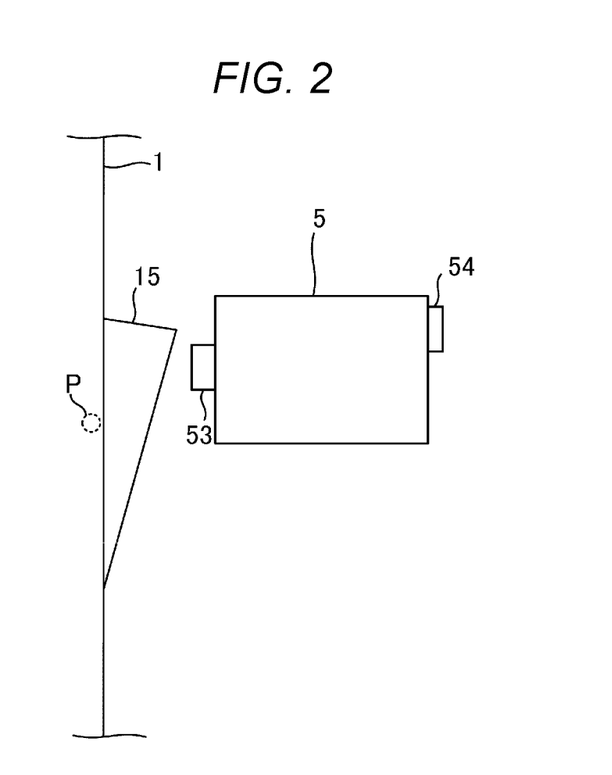
FIG. 2 is a diagram illustrating a power supply switch and an Internet of Things Module (IOT module).

FIG. 2 is a diagram illustrating the power supply switch 15 and the IOT module 5.

The power supply switch 15 is disposed on an upper portion of a side surface of the printer 1, for example, and switches the power ON and OFF. In the first embodiment, the power supply switch 15 is a rocker switch, and pivots around a fulcrum P that is a central portion in a vertical direction of FIG. 2. The power supply switch 15 turns the power of the printer 1 off in a state in which the lower side of the power supply switch 15 is pressed as in FIG. 2, and turns the power of the printer 1 on in a state in which the upper side of the power supply switch 15 is pressed (refer to FIG. 3). However, other configurations are also contemplated.

The physical switch 53 of the IOT module 5 comes into physical contact with the power supply switch 15 of the printer 1, to displace the power supply switch 15, and thereby turns on the power of the printer 1. In a first embodiment, the physical switch 53 has a rod shape, and is disposed at a position separated from the power supply switch 15 and facing the power supply switch 15. In such an example, the physical switch 53 moves forward and backward with respect to the power supply switch 15.

Figure 3:
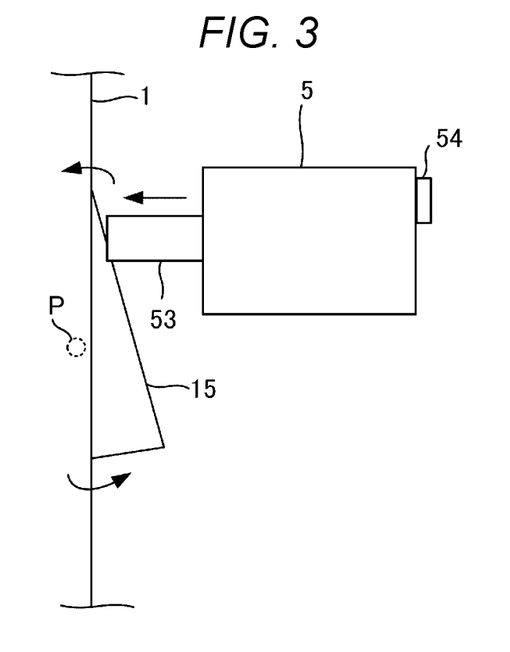
FIG. 3 is a diagram illustrating a state in which the power supply switch is turned on by driving a physical switch.

FIG. 3 is a diagram illustrating a state in which the power supply switch 15 is turned on by driving the physical switch 53.

The controller 51 drives the physical switch 53 by using a driving source (not illustrated), such as a stepper motor, electric motor, or other actuator, to cause the physical switch 53 to extend toward the power supply switch 15. When the physical switch 53 extends, the physical switch 53 presses the upper side of the power supply switch 15, thus pivoting the power supply switch 15 and turning the power of the printer 1 on.

Since the IOT module 5 covers the power supply switch 15, it is difficult for a user to press the upper side of the power supply switch 15. Thus, a button 54 is provided on a case of the IOT module 5. When a user presses the button 54, the IOT module 5 drives the physical switch 53 to turn on the power supply switch 15. Thus, the physical switch 53 may be actuated in response to user input or in response to a signal from a controller 51 (shown in FIG. 1).

In addition, the IOT module 5 may cover both the upper side and the lower side (with respect to the fulcrum P) of the power supply switch 15, and may include multiple physical switches 53. In such an example, a first physical switch 53 and a second physical switch 53 respectively press the upper side and the lower side of the power supply switch 15. In such an example, the IOT module 5 may include buttons 54 respectively corresponding to each of the physical switches 53. It is contemplated that the power supply switch 15 may be a button, a toggle switch, or a slide switch, and may have any shape suitable for selectively powering and depowering the printer 1. The physical switch 53 may have any shape as long as the physical switch 53 can switch the power supply switch 15 ON and OFF.

Figure 4:
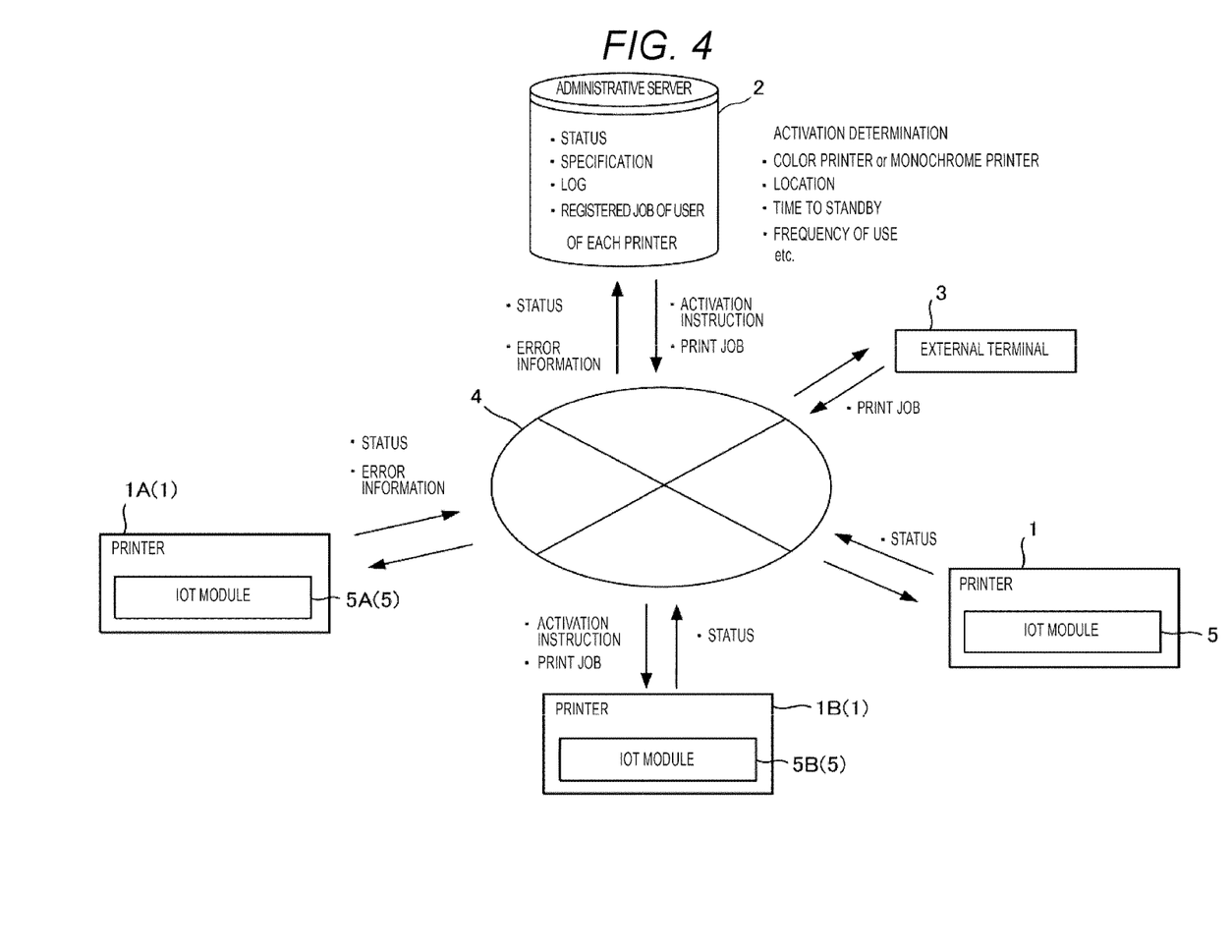
FIG. 4 is a diagram illustrating a function of an administrative server.
Figure 5:
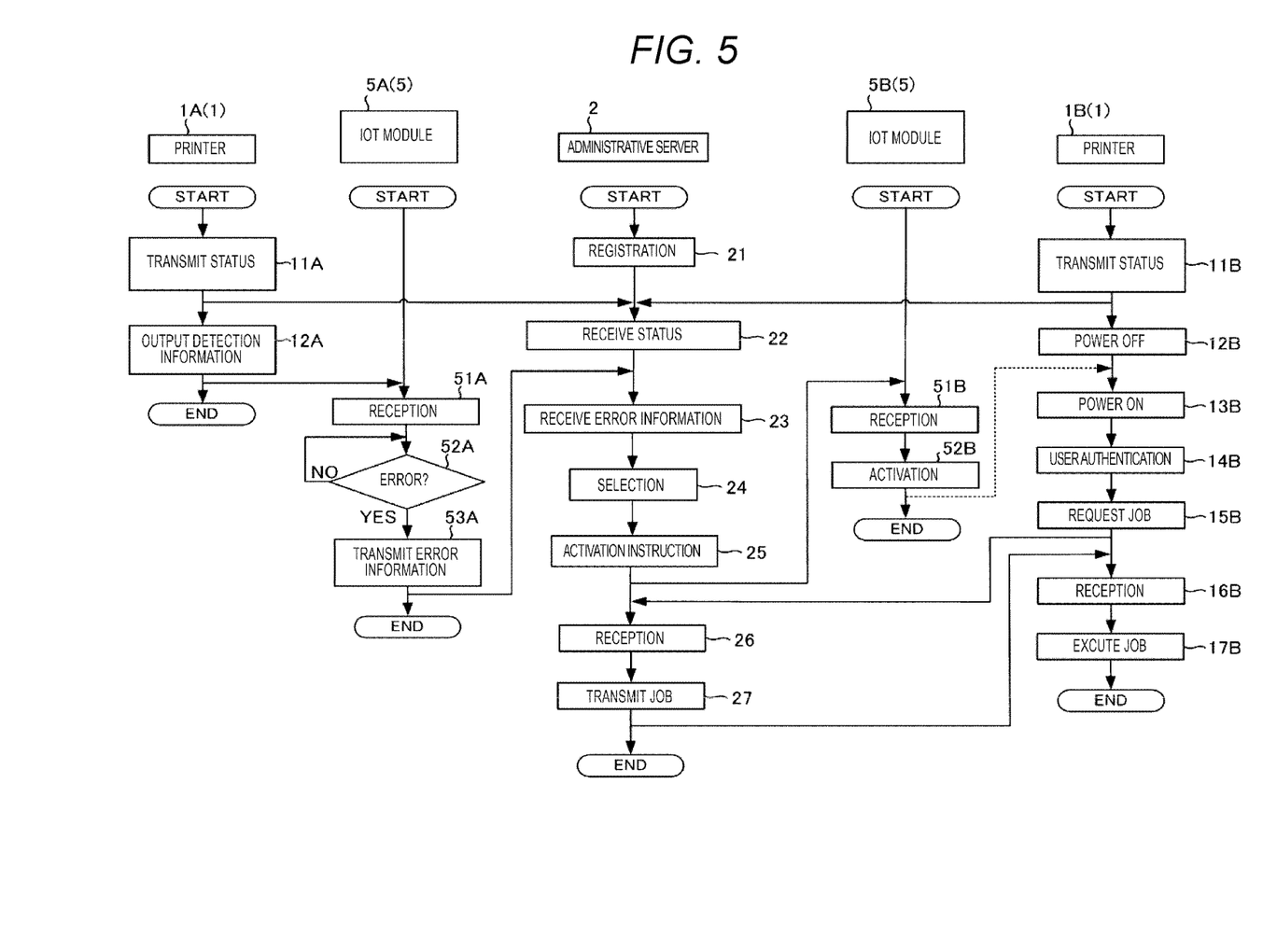
FIG. 5 is a flowchart illustrating processes of respective elements.

FIG. 4 is a diagram illustrating a function of the administrative server 2. FIG. 5 is a flowchart illustrating processes of printers 1, administrative server 2, and TOT modules 5. Hereinafter, an activation process of a printer 1 by the printing system 100 will be described.

Hereinafter, a case in which among the plurality of printers 1, a printer 1A has an error, and a printer 1B of which the power is turned off is activated will be described. As described above, when the printers 1 are desired to be independently described, in the following, the printers 1 may be described as the printers 1A and 1B. Similarly, in some cases, the IOT module 5 of the printer 1A is described as an IOT module 5A, and the IOT module 5 of the printer 1B is described as an IOT module 5B.

The controllers 13, 21, and 51 of the printers 1, administrative server 2, and IOT modules 5 respectively read programs in the memories 14, 22, and 52, to respectively execute the following processes.

First, a user is subjected to authentication by the external terminal 3, and transmits a print job, which is desired to be executed, from the external terminal 3 to the administrative server 2.

Subsequently, the administrative server 2 registers a print job of a user (Act 21).

The printers 1A and 1B constantly transmit their status to the administrative server 2 (Act 11A) (Act 11B). For example, an IoT module 5 can detect a power off status, or an SNMP trap is also possible when shutdown. In a first embodiment, the states of ON and OFF of the power are included as the statuses. In the first embodiment, it is assumed that the printer 1A (first printer) has high frequency of use, and the printer 1B (second printer) has low frequency of use. Since the printer 1B has low frequency of use, the power of the printer 1B is turned off by an operation of a user (Act 12B). In this case, the printer 1B transmits the status, in which the power is turned off, to the administrative server 2 (Act 11B).

The administrative server 2 receives the status of each of the printers 1A and 1B and updates the status in a memory of the server 2 (Act 22).

In the printer 1A, the sensor 12 monitors each unit of the printer 1A, and outputs a detection signal to the controller 51 of the IOT module 5A and the controller 13 of the printer 1A (Act 12A).

The IOT module 5A (the controller 51 of the IOT module 5A) receives the detection signal (Act 51A).

The controller 51 of the IOT module 5A determines whether the printer 1A has an error based on the received detection signal (Act 52A). Example errors which may be determined to be present by the controller 51 of the IOT module 5A include running out of sheets in the cassette; running out of toner; fullness of the waste toner; or a state in which such errors are expected to occur (for example, the residual amount of toner is equal to or less than a threshold). In addition, the IOT module 5A may also determine that a sheet jam is present, for example.

When the IOT module 5A determines that an error occurs (or an error is expected to occur, which will be considered hereinafter without need for specific recitation) (YES in Act 52A), the IOT module 5A transmits error information to the administrative server 2 (Act 53A). The error information includes information indicating the type of errors determined to be present.

The administrative server 2 receives the error information (Act 23).

The administrative server 2 stores a status, a specification, an installation location, and a log of execution jobs of each printer 1. The specification indicates the printer being a color printer in which a plurality of colors can be printed, or being a monochrome printer in which only monochrome printing is possible; time to the standby; and the printing speed. The administrative server 2 may acquire the specification or the installation location from each printer 1, or may acquire the specification or the installation location of each printer 1 through registration by an administrator.

When the administrative server 2 receives the error information from the printer 1A (Act 23), the administrative server 2 selects the printer 1B from among the printers 1 of which the powers are turned off, based on the specification or the installation location of the printer 1A (Act 24). The selected printer (e.g., printer 1B) is instructed to be activated by the administrative server 2. For example, the administrative server 2 selects a printer to be activated from among the printers 1 of which the powers are turned off. In one example, the printer 1B is selected to be activated based on a sum of evaluation values of respective evaluation items being the highest, or based on the sum of evaluation values of respective evaluation items being equal to or greater than a reference value. Accordingly, a plurality of printers 1 of which the powers are turned off may be activated.

In the evaluation item of the specification, the evaluation value increases as the specification becomes similar to the specification of the printer 1A which has an error. For example, when the printer 1A is a color printer, the evaluation value of the specification of the printer 1B is higher in a case where the printer is a color printer than in a case where the printer is a monochrome printer. In the evaluation item of the installation location of the printer 1B, the evaluation value increases as the printer is closer to the printer 1A. The evaluation value increases as the time to the standby becomes shorter, and as the printing speed becomes faster. The administrative server 2 determines that the frequency of use is high as the frequency of execution of jobs is high based on the log of each printer 1, and assigns a high evaluation value to the printer 1. Thus, the administrative server 2 selects an alternative printer 1(B) which most similarly represents printer 1(A) based on criteria discussed herein, or other considerations.

Once the administrative server 2 selects an alternative printer 1(b) as described above, the administrative server 2 transmits an activation instruction to the IOT module 5B of the selected printer 1B (Act 25).

When the IOT module 5B receives the activation instruction (Act 51B), the IOT module 5B drives the physical switch 53 to switch the power supply switch 15 of the printer 1B from OFF to ON (Act 52B).

In this manner, the power of the printer 1B is turned on (Act 13B). Once turned on, the sensor 12 of printer 1B detects the state of each unit when the power is turned on, and the sensor 12 transmits a detection signal to the IOT module 5B (similar to Act 12A, as described above). When it is determined that an error occurs based on the detection signal, the IOT module 5B transmits error information to the administrative server 2 (similar to Act 51A to 53A, described above). For clarity, these processes of the printer 1B and the IOT module 5B are not illustrated in the flowchart in FIG. 5.

The following provides one implementation of aspects of the present disclosure. In one example, a user tries to execute a print job by using the printer 1A (which has high frequency of use), and goes to the printer 1A. The user sees that the printer 1A has an error and thus cannot be used. Then, the user goes to the printer 1B of which the power is normally turned off because the frequency of use is low. As described above, in the first embodiment, since the printer 1B has been activated already, the user can immediately execute the print job by using the printer 1B.

To facilitate printing on the printer 1B, the printer 1B acquires identification information of the user, from the IC card via the card reader 18, and approves the user by performing an authentication of the user (Act 14B).

The printer 1B transmits a transmission request for a job to the administrative server 2, via user input or manipulation (Act 15B). When the administrative server 2 receives the transmission request (Act 26), the administrative server 2 transmits the registered print job of the user to the printer 1B (Act 27). The administrative server 2 deletes the print job transmitted to the printer 1B, from a storage area which stores a group of standby print jobs for printing.

The printer 1B receives the print job from the administrative server 2 (Act 16B), and executes the print job (Act 17B).

In addition to the above described aspects, other aspects are also contemplated. For example, the IOT module 5 may be provided in the vicinity of each sensor 12 of one printer 1, and may detect whether an error occurs based on the detection signal from each sensor 12 and transmit error information to the administrative server 2. In this case, among the IOT modules 5, one IOT module 5 may receive an activation instruction from the administrative server 2, and switch the physical switch 53 of the printer 1.

Second Embodiment

Figure 6:
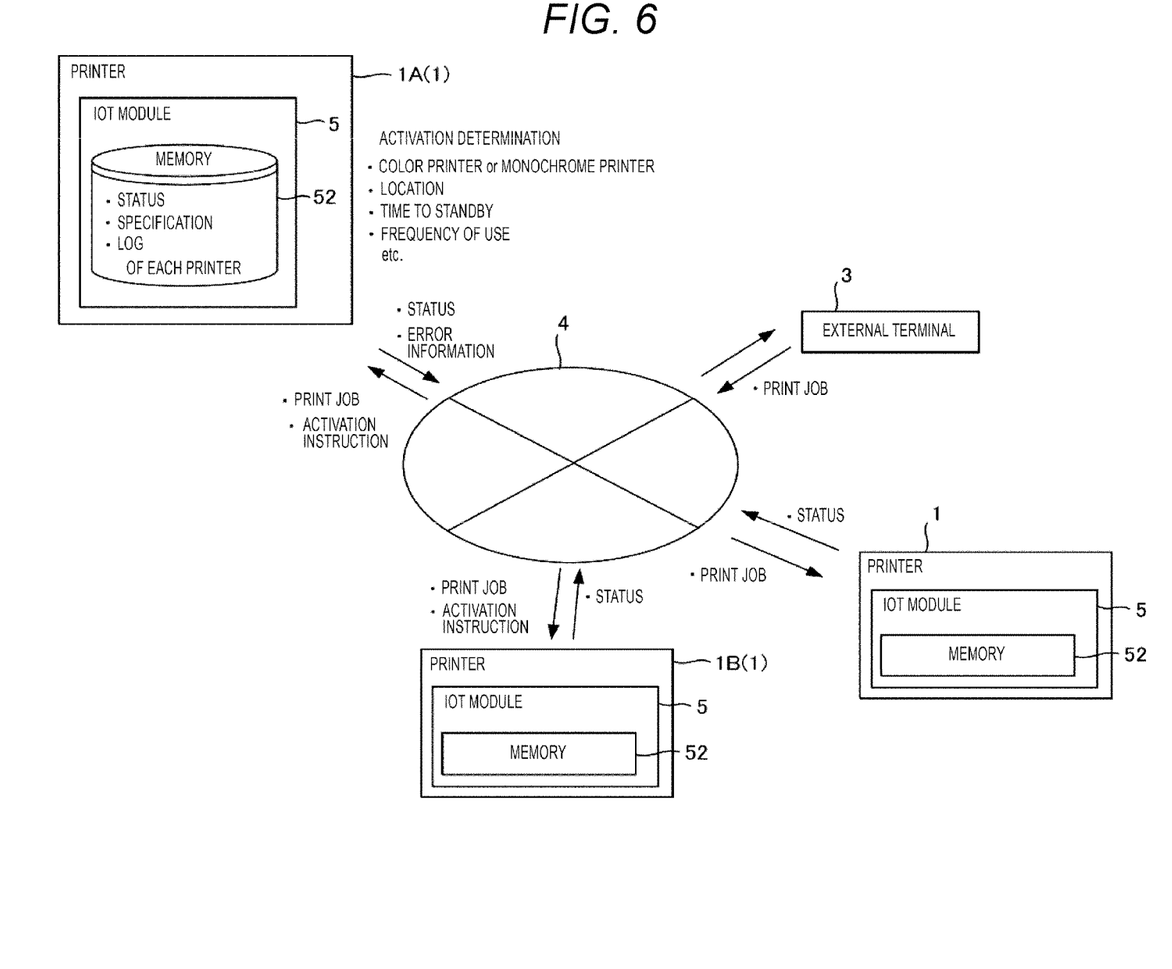
FIG. 6 is a diagram illustrating a function of the IOT module.
Figure 7:
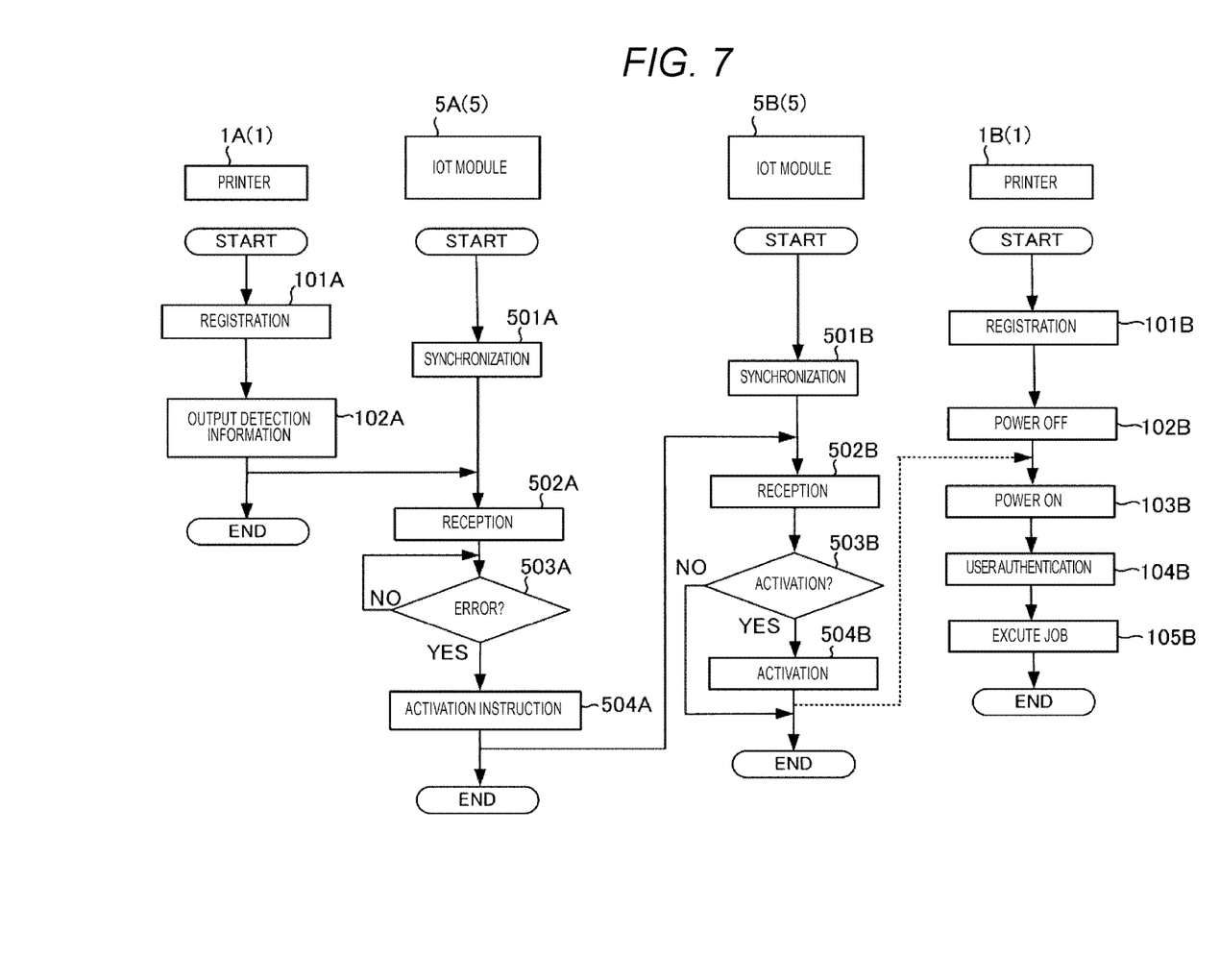
FIG. 7 is a flowchart illustrating processes of a printer and the IOT module.

FIG. 6 is a diagram illustrating a function of the IOT module 5. FIG. 7 is a flowchart illustrating processes of the printers 1A and 1B and the IOT modules 5A and 5B. Hereinafter, a case in which among the plurality of printers 1, the printer 1A has an error, and the printer 1B is activated, is described. In the second embodiment, the printers 1A and 1B and the IOT modules 5A and 5B perform the function of the administrative server 2 described above.

In the second embodiment, the printers 1A and 1B are synchronized with each other regarding a print job (Act 101A and Act 101B), and the print job transmitted to any of the printers 1 can be executed by using any printer 1.

The IOT modules 5 of the printers 1 are synchronized with each other (Act 501A and Act 501B), and store a status, a specification, a log of execution jobs, and an installation location of each printer 1, in a memory 52.

To facilitate explanation, it is assumed that the power of the printer 1B which has low frequency of use is turned off (Act 102B).

In the printer 1A, the sensor 12 monitors each unit of the printer 1A, and outputs detection signals to the controller 51 of the IOT module 5A and the controller 13 of the printer 1A (Act 102A).

The IOT module 5A receives the detection signal (Act 502A). When the IOT module 5A determines that the printer 1A has an error (or is in a state in which an error is expected to occur) based on the detection signal (YES in Act 503A), the IOT module 5A transmits error information and an activation instruction to the IOT module 5B of every printer 1B of which the power is turned off (Act 504A). It is to be noted that more than one printer 1B may receive an activation instruction from the IOT module 5A.

An IOT module 5B of a printer 1B receives the activation instruction (Act 502B), and determines whether the corresponding printer 1B is to be activated (Act 503B). The determination is based upon the same criteria as described with respect to selection of a printer 1B in the first embodiment, above. When the sum of evaluation values of respective evaluation items of the printer 1B is the highest with respect to the sums of evaluation values of other printers 1, or is equal to or greater than a reference value, the IOT module 5B determines that the printer 1B is to be activated based on the specification, the installation location, and the like of the printer 1A which has an error (YES in Act 503B). In summary, a printer 1B is selected to be power on by the IOT module 5A based on similarity between the printer 1A and 1B. The similarity may be based on one or more factors such as printer specifications, printer locations, and the like.

Upon receiving an activation signal, the IOT module 5B drives the physical switch 53 to turn the power supply switch 15 of the printer 1B on (Act 504B).

When it is determined that the printer 1B is not to be activated based on the specification, the installation location, and the like of the printer 1A which has an error (NO in Act 503B), the IOT module 5B does not activate the printer 1B. Such a determination is useful in an example in which a system includes a plurality of printers 1B, where one of the printers 1B may be activated and the remainders remain inactivated.

In an example as described above, a user may go to the printer 1A, and then see that the printer 1A cannot be used. In response, the user may then go to the printer 1B (for which the power is generally turned off). However, since the printer 1B has been activated already, the user can immediately execute the print job by using the printer 1B. That is, the printer 1B approves the user (Act 104B), and executes the print job (Act 105B), as similarly described above.

In addition, the IOT module 5A of the printer 1A which has an error may select a printer 1B to be activated, from among the printers 1 of which the power is turned off. Then, the IOT module 5A transmits an activation instruction only to the IOT module 5B of the selected printer 1B, and may activate the selected printer 1B.

Third Embodiment

Figure 8:
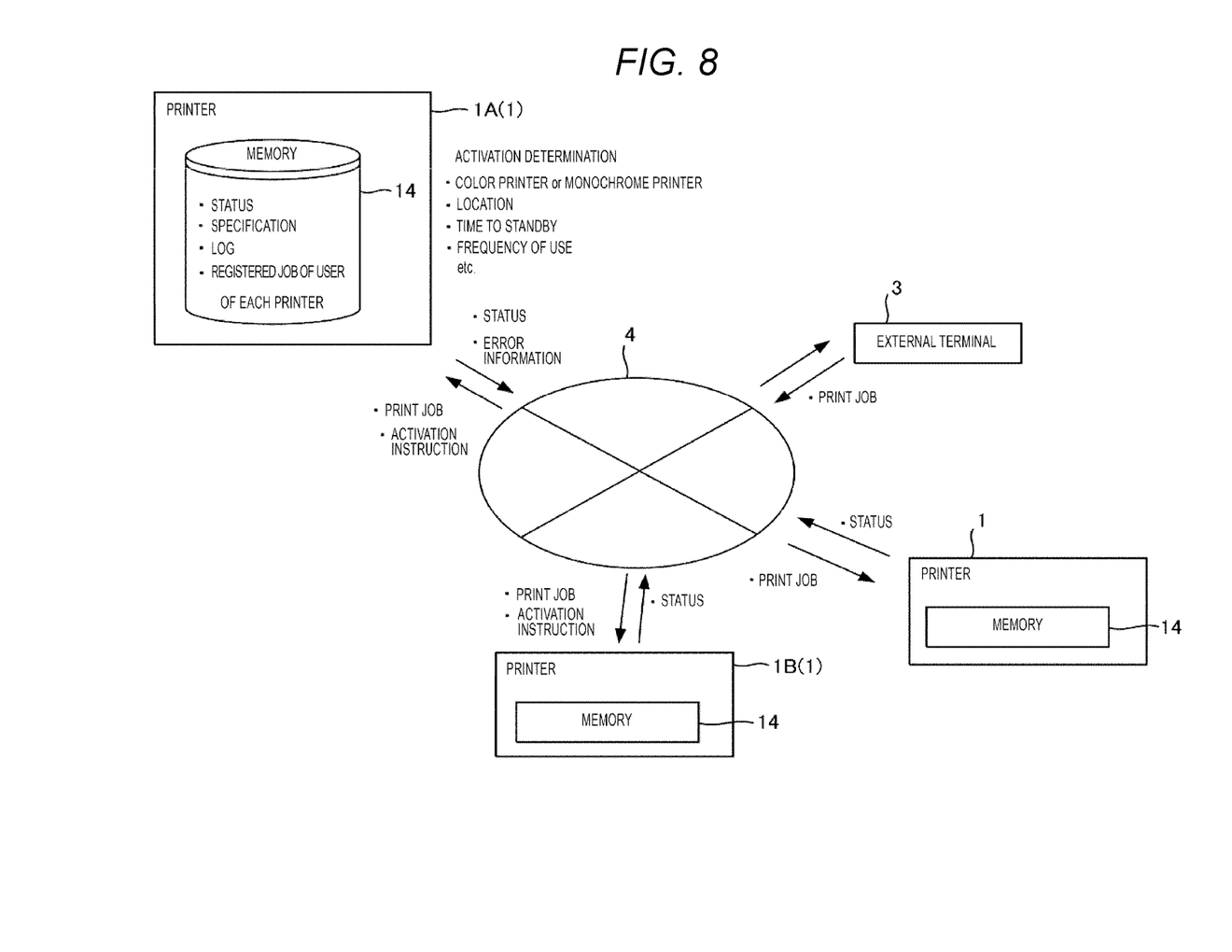
FIG. 8 is a diagram illustrating processes of printers.
Figure 9:
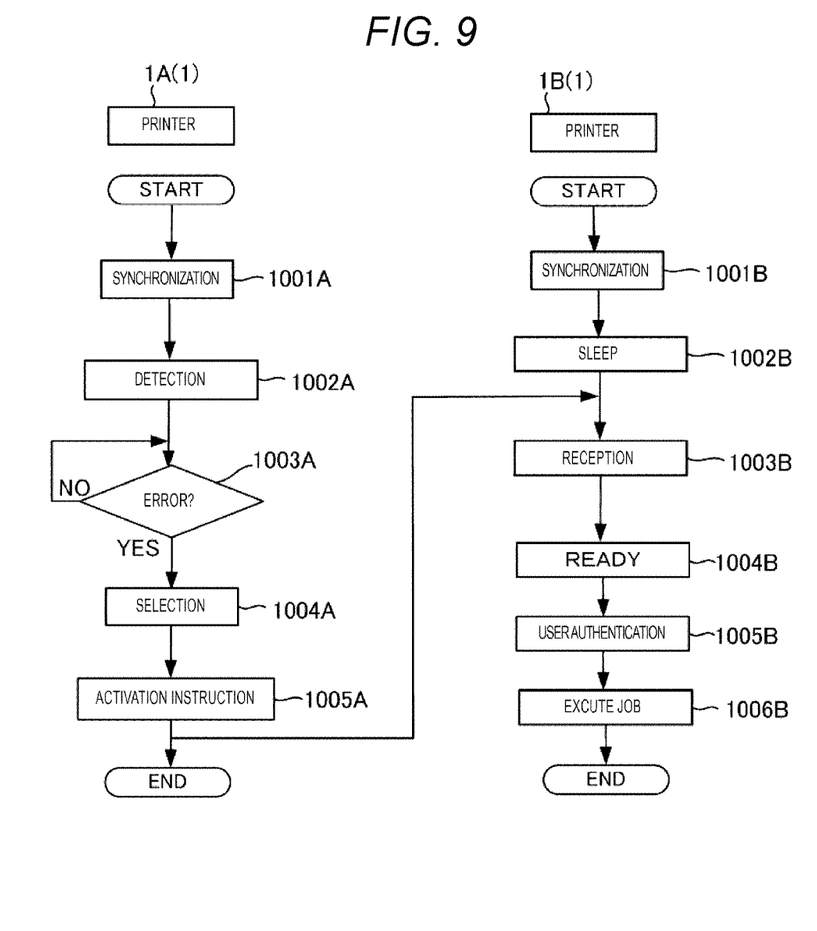
FIG. 9 is a flowchart illustrating processes of the printers.

FIG. 8 is a diagram illustrating processes of the printers 1. FIG. 9 is a flowchart illustrating processes of the printers 1A and 1B.

In the third embodiment, an IOT module 5 is not included in each of the respective printers 1. In the third embodiment, the printer 1A which has an error causes the printer 1B in a sleep mode to transition to a ready mode. The ready mode is a mode in which electric power is supplied to each unit of an MFP in advance so that a job is immediately executed when the job is received. The sleep mode is a mode for suppressing the power consumption during the standby time, and in the sleep mode, electric power is not supplied to the units except for the controller 13 and the unit for receiving a job. The power consumption of the printer 1 is lower in the sleep mode than in the ready mode. When the printer 1 does not receive an input from a user or does not execute a job for a predetermined time, the printer 1 transitions from the ready mode to the sleep mode.

In the third embodiment, the printers 1A and 1B are synchronized with each other (Act 1001A and Act 1001B). When synchronized, a print job transmitted to any of the printers 1 can be executed by using any printer 1 (e.g., either 1A or 1B). When synchronized with each other (Act 1001A and Act 1001B), the printers 1A and 1B store a status, a specification, a log of execution jobs, and an installation location of each printer 1, in the memory 14.

To facilitate explanation, it is assumed that the printer 1B has low frequency of use and transitions to the sleep mode (Act 1002B).

The printer 1A monitors each unit of the MFP by using the sensor 12 (Act 1002A), and when it is determined that the printer 1A has an error (or is in a state in which an error is expected to occur) (YES in Act 1003A), the printer 1A selects a printer 1B of which the power is to be turned on, from among the printers 1 of which the power is turned off (Act 1004A). The determination criteria are the same as that in the first embodiment. Based on the determination criteria, the printer 1A selects a printer 1B in which the specification is similar to that of the printer 1A (which has an error), or the installation location is close to the printer 1A.

In response, the printer 1A transmits an activation instruction to the selected printer 1B (Act 1005A).

When the printer 1B receives the activation instruction (Act 1003B), the printer 1B transitions from the sleep mode to the ready mode (Act 1004B). In this manner, in the third embodiment, the activation instruction is an instruction for causing a printer to transition from the sleep mode to the ready mode.

In operation, a user goes to the printer 1A which has high frequency of use, and then sees that the printer 1A cannot be used due to an error. Then, the user goes to the printer 1B, which is usually in a sleep mode because the printer 1B has low frequency of use. However, since the printer 1B has transitioned to the ready mode, according to aspects described herein, the user can immediately execute the print job by using the printer 1B.

That is, the printer 1B approves the user (Act 1005B), and executes the print job (Act 1006B), as described in detail above.

Modification Example

The third embodiment may be applied to the second embodiment. That is, each of the printers 1A and 1B does not include an IOT module 5. When an error is detected, the printer 1A transmits error information and an activation instruction to all printers 1B that are in the sleep mode. A determination is made as to which printer 1B to transition to the ready mode based on criteria such as the specification, the installation location, and the like of the printer 1A (which has an error), and in response, one of the printers 1B transitions to the ready mode.

In the second embodiment, the administrative server 2 may be included which is synchronized with the printers 1, and holds information of the printers 1. When the IOT module 5B of a printer 1B receives an activation instruction, the IOT module 5B acquires information of the printer 1A from the administrative server 2, and may determine whether the corresponding printer 1B is to be activated.

As described above, according to the technique described in this specification, it is possible to provide a technique of reducing the time for causing a printer to execute a job.

While certain embodiments have been described, these embodiments have been presented by way of example only, and are not intended to limit the scope of the disclosure. Indeed, the novel apparatus, methods and system described herein may be embodied in a variety of other forms; furthermore, various omissions, substitutions and changes in the form of the apparatus, methods and system described herein may be made without departing from the spirit of the disclosure. The accompanying claims and their equivalents are intended to cover such forms or modifications as would fall within the scope and spirit of the disclosure.

What is claimed is:

1. A method of performing a print operation, comprising:
   receiving a print request to perform the print operation on a first printer;
   identifying an error with respect to the first printer; and
   in response to the error, selecting a second printer, which is currently powered OFF, to perform the print request, based on one or more criteria, and transmitting the print request to the second printer, wherein
   the second printer includes a network interface that receives the print request and, responsive thereto, causes the second printer to be powered ON to perform the print operation.

2. The method of claim 1, wherein the network interface has a secondary power source independent from a primary power source of the second printer.

3. The method of claim 1, wherein a print server selects the second printer and transmits the print request to the second printer.

4. The method of claim 1, wherein the first printer has a network interface that selects the second printer and transmits the print request to the second printer.

5. The method of claim 1, wherein the error includes one or more of low toner, low sheets of printing medium, or full toner waste, or an expectation that the first printer will experience one or more of low toner, low sheets of printing medium, or full toner waste.

6. The method of claim 1, wherein the criteria includes one or more of specifications of the first and second printers, and locations of the first and second printers.

7. The method of claim 1, wherein the second printer is powered ON by actuating a button to engage a power switch of the second printer.

8. A printing network comprising:
   a print server;
   a first printer; and
   a second printer coupled to a primary power supply and including a network interface that includes a secondary power supply, wherein
   in response to identifying an error with respect to a print request transmitted to the first printer, one of the print server and the first printer selects another printer to perform the print request, based on one or more criteria, and transmits the print request to said another printer, and
   if said another printer is the second printer and the second printer is powered OFF and disconnected from the primary power supply, the network interface, upon receipt of the print request, causes the second printer to be connected to the primary power supply and be powered ON to perform a print operation specified in the print request.

9. The printing network of claim 8, wherein the network interface, when causing the second printer to be connected to the primary power supply, is powered by the secondary power supply.

10. The printing network of claim 8, wherein the print server selects the second printer and transmits the print request to the second printer.

11. The printing network of claim 8, wherein the first printer has a network interface that selects the second printer and transmits the print request to the second printer.

12. The printing network of claim 8, wherein the error includes one or more of low toner, low sheets of printing medium, or full toner waste, or an expectation that the first printer will experience one or more of low toner, low sheets of printing medium, or full toner waste.

13. The printing network of claim 8, wherein the criteria includes one or more of specifications of the first and second printers, and locations of the first and second printers.

14. The printing network of claim 8, wherein the second printer is powered ON by actuating a button to engage a power switch of the second printer and connect the second printer to the primary power supply.

* * * * *